United States Patent [19]

Fong

[11] 4,238,786

[45] Dec. 9, 1980

[54] VISUAL DISPLAY AND ELECTRO-OPTICAL TRANSDUCER

[76] Inventor: Melvin G. Fong, 681 Market St., Suite 948, San Francisco, Calif. 94105

[21] Appl. No.: 78,605

[22] Filed: Sep. 24, 1979

[51] Int. Cl.³ .......................... G08B 5/00; G02B 27/17

[52] U.S. Cl. .................................. 340/378.4; 340/373; 350/285

[58] Field of Search ............ 340/700, 701, 764, 378.4, 340/373; 178/15; 350/6.6, 285

[56] References Cited

U.S. PATENT DOCUMENTS 4,021,096 5/1977 Dragt .................................. 350/285

*Primary Examiner*—Harold I. Pitts

*Attorney, Agent, or Firm*—Charles K. Epps

[57] ABSTRACT

A visual display comprises a plurality of electro-optical transducers, each transducer comprising a light-reflective element mounted to an elastic, substantially planar membrane, and electromagnetic means for moving the light-reflective element pivotally, rotationally and axially relative to the plane of the supporting elastic membrane. Means is also provided for directing focused light rays from a single light source upon the light-reflective elements, filtering the light rays through selected color discs and impinging the colored light rays upon a display screen.

10 Claims, 6 Drawing Figures

VISUAL DISPLAY AND ELECTRO-OPTICAL TRANSDUCER

SUMMARY OF THE INVENTION

This invention relates generally to the visual presentation of electrical signals in a light display device. The invention more particularly relates to light display devices having movable light-reflective assemblies actuated electromagnetically by electrical impulses.

It is common practice, and well known in the art, to provide a light display apparatus having light-reflective elements which are moved or vibrated by electrical signals from an audio system. However, such displays employ relatively inefficient processes by which sound vibrations induce movement of the reflective elements, and they suffer from one or more disadvantages. Some displays consume a great deal of power and require high level electrical inputs; others use light-reflective elements which are moved in restricted paths and produce predictable and repetitious movements of light on a display screen.

Display devices constructed in accordance with this invention utilize electromagnetic forces to move one or more light-reflective assemblies having a mass substantially less than that required to be moved by the known prior art displays. This, in itself, eliminates one of the major disadvantages of existing devices because the excessive energy required to move large speaker cones, vibrating posts or trapped air pockets is unnecessary. More particularly, only low level electrical impulses are required by the invention to produce very large deflections of one or more light reflecting assemblies.

One object of the present invention is to provide an electro-optical transducer for use in visual displays.

Another object is to provide an electro-optical transducer which can be powered by low level electrical impulses such as those produced by a small, portable transistor radio.

It is another object of the invention to provide an electro-optical transducer having a resiliently supported light-reflective assembly which is moved by small stationary electromagnets.

A further object of the invention is to provide an electro-optical transducer which is relatively small in size.

Other objects of this invention will become apparent in view of the following detailed description.

BRIEF DESCRIPTION OF THE DRAWINGS

In the drawings, forming a part of this application, and in which like parts are identified by like reference numerals.

DESCRIPTION OF THE PREFERRED EMBODIMENT

Figure 1:
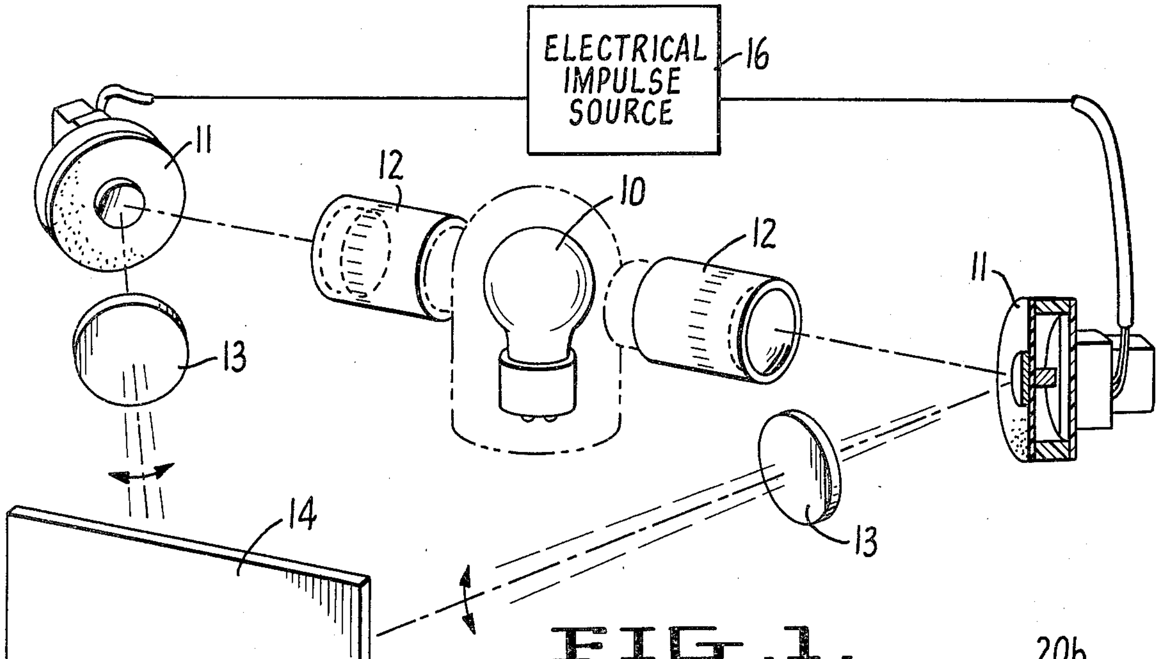
FIG. 1 is a perspective view of a preferred embodiment of the invention in a visual display.
Figure 1:
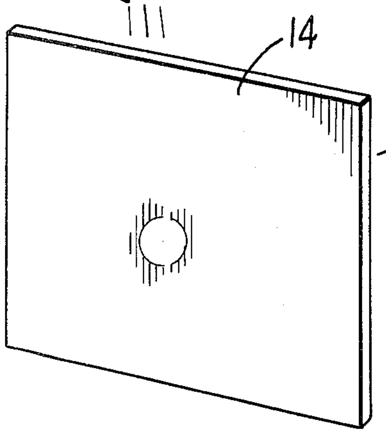

Referrring to FIG. 1, the visual display essentially comprises a light source 10, a pair of electro-optical transducers 11, means 12 (including lenses) for collimating, focusing and directing light rays from the light source 10 upon the electro-optical transducers 11, colored filters 13 and a display screen 14 upon which light reflected from the electro-optical transducers 11 impinges. Each of the electro-optical transducers is connected to and electrically driven by an electrical impulse source 16 which might be an audio amplifier. In a preferred display arrangement, the electrical impulse source 16 provides at least two electrical outputs, one output being connected to each transducer 11, respectively. It is contemplated, of course, that many additional transducers can be utilized in the apparatus shown and, if desired, several transducers can be operated using the same electrical output signal from the electrical impulse source.

Figure 2:
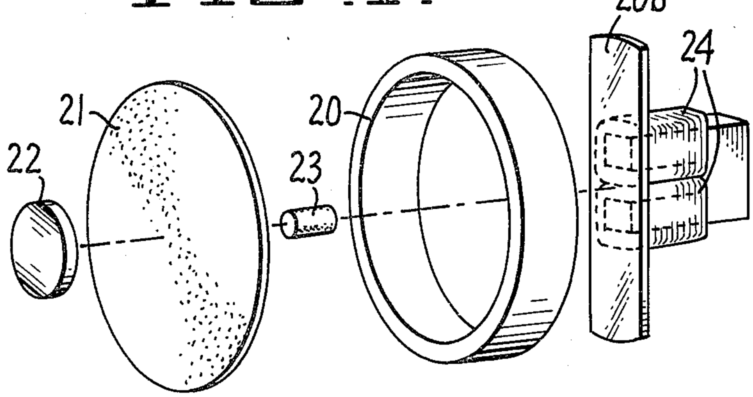
FIG. 2 is a perspective and exploded view of an electro-optical transducer constructed in accordance with this invention.
Figure 3:
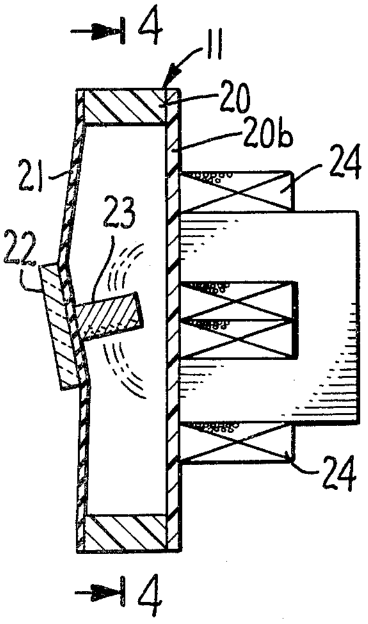
FIG. 3 is a transverse section through the transducer of FIG. 2 with parts assembled.
Figure 4:
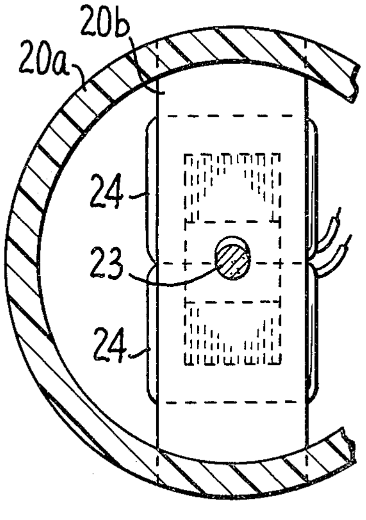
FIG. 4 is a transverse section of the transducer taken on lines 4—4 of FIG. 3
Figure 6:
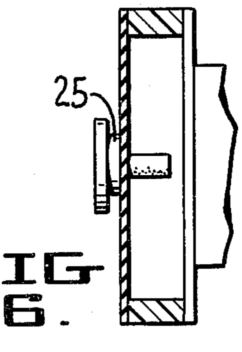
FIG. 6 is a transverse section of the transducer having the light reflective element mounted upon a pedestal.

Referring to FIGS. 2, 3 and 4, there is shown a preferred embodiment of the invention in an electro-optical transducer 11, which comprises a support 20, an elastic, substantially planar membrane 21, a light-reflective element 22, a magnetic element 23, and a pair of electromagnets 24. Support 20 essentially comprises a substantially circular ring **20*a* having an opening therethrough and a strut 20*b* which spans diametrically the opening of the ring. Elastic membrane 21, which may be made of rubber or an elastic polymer, is secured to the face of ring 20*a* on the side opposite the strut 20*b*. Magnetic element 23 and light-reflective 22 are mounted in such a manner that they are in the proximate center of but on opposite surfaces of the elastic membrane 21. This arrangement places the magnetic element 23 (preferably a small permanent magnet) adjacent to the electromagnets 24. It will be apparent, particularly in view of FIG. 3, that a variable or pulsating electric current applied to electromagnets 24 produces variations in magnetic flux which act upon magnetic element 23. Such variations will cause magnetic element 23 and the light-reflective element 22 to be moved pivotally, rotationally and axially relative to the plane of the supporting membrane 21. The resultant movements are dependent upon the mass of the light-reflective element and the degree of elasticity of the elastic membrane 21, which tends to return magnetic element 23 to a position perpendicular to the plane of the elastic membrane 21. If light-reflective element 22 were mounted centrally upon a pedestal 25 as shown in FIG. 6, which, in turn, were mounted centrally to the elastic membrane 21**, amplification and sustenance of the pivotal, rotational, and axial movement will be achieved.

Figure 5:
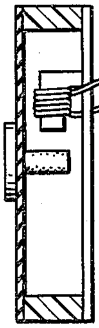
FIG. 5 is a transverse section of the transducer having an alternate arrangement of the electromagnet.

It has been found that electro-optical transducers constructed in accordance with this invention produce very large excursions of the light-reflective element 22 even though the electrical impulses which drive the electromagnets 24 are quite small. In the embodiment shown in FIG. 5, a magnetic coil as small as that used in a miniature dynamic earphone replaces the pair of electromagnets 24 of FIG. 3 and is quite adequate to provide wide angled deflections. Such a device can be powered by the minute electrical output from a small portable transistor radio. The high efficiency of the electro-optical transducers 11 makes them particularly suitable for use in home displays where high level audio volumes might be objectionable.

Although a preferred embodiment of the invention has been illustrated and described, various modifications and changes may be resorted to without departing from the spirit of the invention or the scope of the attached claims, and each of such modifications and changes is contemplated.

What is claimed is:

1. A visual display comprising:
(a) a light source;
(b) a plurality of electro-optical transducers, each transducer comprising a light-reflective element, means resiliently supporting said light-reflective element, and magnetic means for moving said light-reflective element, said magnetic means comprising a magnetic element connected to said resiliently supporting means and at least one electromagnet mounted in spaced proximity to said magnetic element;
(c) means for directing light rays from said light source upon the light-reflective element of each electro-optical transducer; and
(d) a display screen positioned to receive reflected light from each light-reflective element.

2. The visual display of claim 1, and further comprising a plurality of light filters disposed, respectively, in the paths of light rays directed to said display screen.

3. The visual display of claim 1, and further comprising an electrical impulse source having at least two electrical signal outputs, one of said outputs being connected to the electromagnet of at least one electro-optical transducer and the other ouput being connected to the electromagnet of another electro-optical transducer.

4. An electro-optical transducer for use in visual displays, comprising:
a support; an elastic, substantially planar membrane mounted to said support; a light-reflective element mounted to said membrane; a magnetic element mounted to said membrane; and at least one electromagnet mounted to said support in spaced proximity to said magnetic element, said electromagnet being oriented to produce magnetic flux lines directed towards said magnetic element; whereby a variable electric current applied to said electromagnet produces pivotal, rotational and axial movement of said light-reflective element.

5. The transducer of claim 4, said magnetic element being a permanent magnet.

6. An electro-optical transducer for use in visual displays, comprising:
a support; an elastic, substantially planar membrane mounted to said support; a light-reflective element having substantially planar reflector surface mounted to said membrane, the plane of said reflector surface being substantially parallel to the plane of said membrane; a magnetic element mounted to said membrane; and a pair of electromagnets mounted to said support in spaced proximity to and on opposite sides of said magnetic element, said pair of electromagnets being oriented to produce magnetic flux lines directed towards said magnetic element; whereby a variable electric current applied to said electromagnets produces pivotal, rotational and axial movement of said light-reflective element.

7. The transducer of claim 6, said support comprising a substantially circular ring having an opening therethrough, said elastic membrane covering the opening through said ring, said light-reflective element and magnetic element being mounted on opposite sides of said membrane proximate the center thereof.

8. The transducer of claim 6, said support comprising a substantially circular ring having an opening therethrough, and a strut spanning the opening through said ring, said elastic membrane covering the opening through said ring, said light-reflective element and magnetic element being mounted on opposite sides of said membrane proximate the center thereof, said pair of electromagnets being mounted to said strut.

9. The transducer of claim 6, said magnetic element being a permanent magnet.

10. An electro-optical transducer for use in visual displays, comprising:
a support; an elastic planar membrane mounted to said support; a pedestal mounted to said membrane; a light-reflective element mounted to said pedestal; a magnetic element mounted to said membrane; and at least one electromagnet mounted to said support in spaced proximity to said magnetic element, said electromagnet being oriented to produce magnetic flux lines directed towards said magnetic element; whereby a variable electric current applied to said electromagnet produces pivotal, rotational and axial movement of said light-reflective element.

* * * * *